United States Patent
Kao

(10) Patent No.: US 6,713,003 B1
(45) Date of Patent: Mar. 30, 2004

(54) METHOD OF MANUFACTURE WRIST PAD

(76) Inventor: Semi Kao, No 5, Lane 198, St. Chung-Shoue, Charng-Sha Village, Hua-Tan Hsiang, Chang-Hua Hsien (TW)

( * ) Notice: Subject to any disclaimer, the term of this patent is extended or adjusted under 35 U.S.C. 154(b) by 0 days.

(21) Appl. No.: 10/235,659
(22) Filed: Sep. 6, 2002
(51) Int. Cl.[7] .............................................. B29C 44/02
(52) U.S. Cl. ........................ 264/51; 264/157; 264/296
(58) Field of Search ........................ 264/51, 157, 296

(56) References Cited

U.S. PATENT DOCUMENTS

| | | | | |
|---|---|---|---|---|
| 4,076,789 A | * | 2/1978 | Geller et al. ................. 264/259 |
| 4,596,684 A | * | 6/1986 | Kumasaka et al. ........... 264/54 |
| 5,078,933 A | * | 1/1992 | Ou-Yang ..................... 264/46.1 |
| 5,994,450 A | * | 11/1999 | Pearce ......................... 524/505 |
| 6,187,837 B1 | * | 2/2001 | Pearce ......................... 523/105 |
| 6,638,985 B2 | * | 10/2003 | Gehlsen et al. ............... 521/79 |

* cited by examiner

*Primary Examiner*—Allan R. Kuhns
(74) *Attorney, Agent, or Firm*—Dennison, Schultz, Dougherty & MacDonald

(57) ABSTRACT

A method of manufacturing a wrist pad, comprising the steps of: a. Knead and stir a mixture having natural rubber and foaming agent repeatedly to make it well mixed. b. Press the well mixed mixture into a plank element. c. Form an arched portion on the plank element. d. Foam the plank element with the arched portion so that a chemical reaction will occur between the natural rubber and the foaming agent to produce an air pressure for forming the plank element to a wrist pad, and e. Cool the foamed wrist pad and cut the wrist pad into a predetermined shape.

7 Claims, 3 Drawing Sheets

```
┌─────────────────────────────────────────────────┐
│ Sending a mixture having natural rubber and foaming │
│ agent to a kneading machine to knead it repeatedly. │
└─────────────────────────────────────────────────┘
                          │
┌─────────────────────────────────────────────────┐
│ Sending the mixture to a stirring machine via a │
│ conveying table to make the mixture well mixed. │
└─────────────────────────────────────────────────┘
                          │
┌─────────────────────────────────────────────────┐
│ Sending the well mixed mixture to a pressing machine │
│ to press the mixture into a plank element.      │
└─────────────────────────────────────────────────┘
                          │
┌─────────────────────────────────────────────────┐
│ Providing a cloth piece at a side of the plank element, │
│ and then pressing the plank element at the opposite side │
│ from the cloth piece onto a fixture device by hand to │
│ make the cloth piece and the plank element arched │
│ according to the shape of the fixture device.   │
└─────────────────────────────────────────────────┘
                          │
┌─────────────────────────────────────────────────┐
│ Sending the plank element (with the fixture device) to a │
│ foaming machine and add predetermined dosages of sulfur │
│ to make the natural rubber react with the foaming agent │
│ such that the plank elements will foam and generating gas to │
│ secure the cloth piece on the plank element.    │
└─────────────────────────────────────────────────┘
                          │
┌─────────────────────────────────────────────────┐
│ Removing the fixture device from the foamed plank │
│ element, a wrist pad is made at this time. The wrist pad │
│ has a wrist bump which is an arched portion on the │
│ wrist pad formed by the fixture device.         │
└─────────────────────────────────────────────────┘
                          │
┌─────────────────────────────────────────────────┐
│ Air cool the wrist pad and cut it into predetermined shape. │
└─────────────────────────────────────────────────┘
```

FIG. 1

METHOD OF MANUFACTURE WRIST PAD

FIELD OF THE INVENTION

The present invention relates generally to a computer applied product, and more particularly to a wrist pad.

BACKGROUND OF THE INVENTION

In prior art, a wrist pad or a mouse pad was made from a foamed material, such as PU, EVA or foam, molded in a mold with a cloth piece attached on the surface thereof by glue. In the present market, plenty of wrist pads with different shapes were brought to consumers. The shape of the wrist pad is corresponding to the cavity of the mold such that if one wanted to manufacture wrist pads with different shapes, one must have different molds to manufacture them or one must change the shape of the cavity of the mold to meet the shape one wanted.

In conclusion, if a manufacturer wants to manufacture wrist pads with different shapes, he/she must have plenty of molds with different cavities. There will be a larger cost to prepare these molds.

In addition, the conventional wrist pad was provided with a wrist bump thereon to support user's wrist. The wrist bump has inserted a soft material, such as foam, therein; it can not support the wrist in a fully supporting manner.

SUMMARY OF THE INVENTION

The primary objective of the invention is to provide a wrist pad, which has no mold in the processes to manufacture it and can manufacture the wrist pads with different shapes.

According to the objectives of the invention, a method of manufacture a wrist pad, comprising the step of: a. Knead a mixture having natural rubber and foaming agent repeatedly to make it well mixed. b. Press the well mixed mixture into a plank element. c. Form an arched portion on the plank element. d. Foam the plank element with the arched portion so that a chemical reaction will occur between the natural rubber and the foaming agent to produce an air pressure for forming the plank element to a wrist pad, and e. Cool the foamed wrist pad and cut the wrist pad into a p redetermined shape.

According to the method, the wrist pad has a flat portion and a wrist bump thereon which is the arched portion.

BRIEF DESCRIPTION OF THE DRAWINGS

FIG. 1 is a flow chart of a preferred embodiment of the present invention;

DETAILED DESCRIPTION OF THE INVENTION

Please refer to FIG. 1, a method to manufacture a wrist pad of the present invention comprises the steps of:

First step is sending a mixture having natural rubber and foaming agent to a kneading machine to knead it repeatedly. And then, sending the mixture to a stirring machine via a conveying table to make the mixture well mixed.

Next, sending the well mixed mixture to a pressing machine to press the mixture into plank elements 2.

Figure 2:
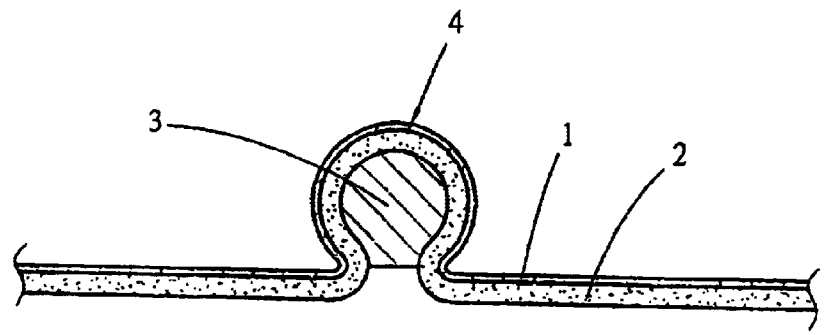
FIG. 2 is a lateral view of a piece element with a wrist bump thereon.

The fourth step of the present invention is that, referring to FIG. 2, providing a cloth piece 1 at a side of the plank element 2, and then pressing the plank element 2 at the opposite side from the cloth piece 1 onto a fixture device 3 by hand to make the cloth piece 1 and the plank element 2 arched according to the shape of the fixture device 3.

Fifth, sending the plank element 2 (with the fixture device 3) to a foaming machine and adding predetermined dosages of sulfur to make the natural rubber react with the foaming agent such that the piece elements will foam and generating gas to secure cloth piece 3 on the plank element 2.

Sixth, removing the fixture device 3 from the foamed plank element 2, a wrist pad 10 is made at this time. The wrist pad 10 has a wrist bump 4 which has arched portion on the wrist pad 10 formed by the fixture device 3.

Last, air cooling the wrist pad 10 and cutting it into predetermined shape.

The kneading machine, the stirring machine, pressing machine and the foaming machine described above are conventional equipment, so I will not describe their detail here.

Figure 3:
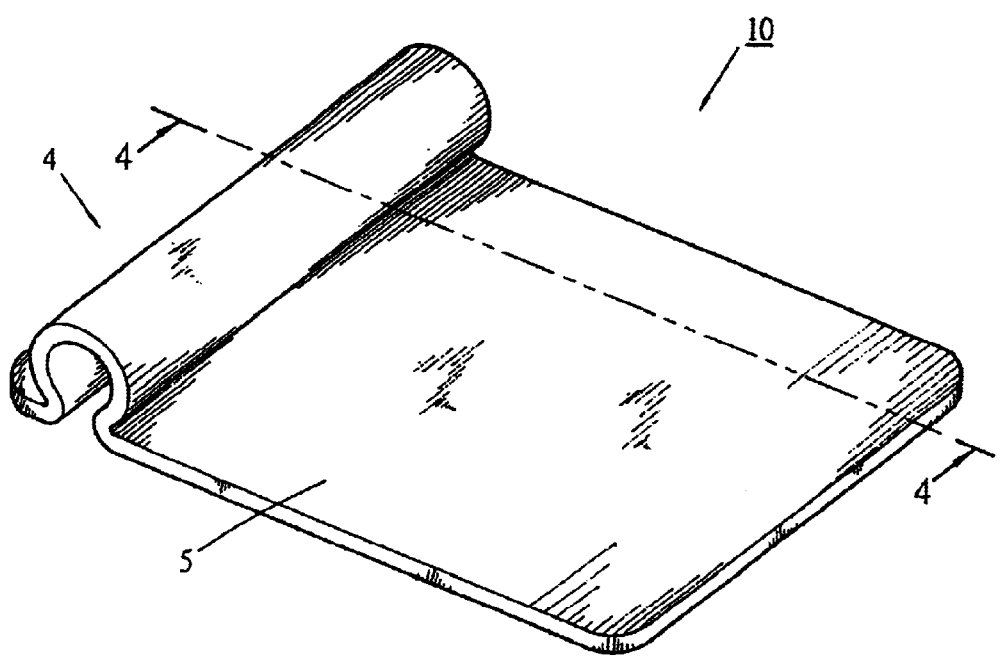
FIG. 3 is a perspective view of a wrist pad, which is made from the method of the preferred embodiment of the present invention.
Figure 4:
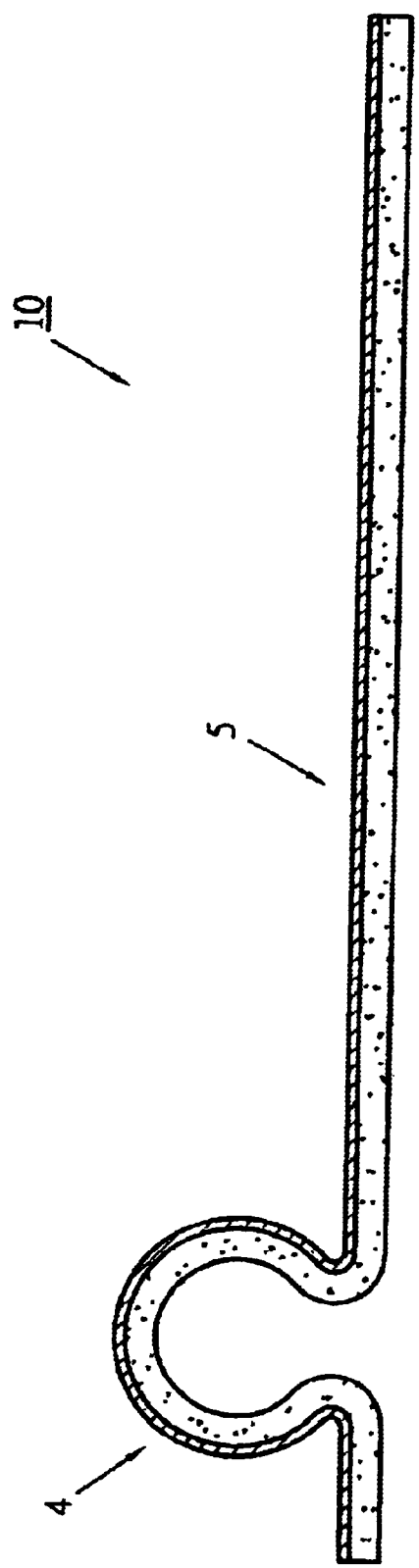
FIG. 4 is a sectional view along the 4—4 line in FIG. 3.

Please refer to FIG. 3 and FIG. 4, the wrist pad 10 made from the method of the present invention has a flat portion 5 and the wrist bump 4 at a side of the flat portion 5. The wrist bump 4 has a Ω shape in the cross section thereof (which means the wrist bump 4 is hollow) so that the wrist bump 4 has a superior flexible capacity. When a user puts his/her hand on the wrist pad 10 of the present invention, the wrist bump 4 will be deformed according to the wrist and fully support the wrist resting on it. The dimension of an opening under the wrist bump 4 is smaller than the dimension of the hollow space in the wrist bump 4 such that the wrist bump 4 will not be pressed flat.

The advantages of the present invention are:
1. The bottom of the wrist pad 10 of the present invention is natural rubber so that it does not need to provide a rubber layer at the bottom side thereof to prevent it from slipping.
2. When the natural rubber is foamed, there will be air generated in the foamed rubber and the air pressure will make the cloth piece fixedly attached on the foamed rubber, such that no glue is added in the wrist pad of the present invention.
3. The wrist pad of the present invention has a wrist bump thereon. The wrist bump is an arched portion of the wrist pad and it is molded with the wrist pad as a unit such that there is no need to provide a mold with a specific cavity to mold the wrist bump therein. The shape of the wrist bump corresponds to the shape of the fixture device, so manufacturer can change different fixture devices to form the wrist bumps with different shapes.
4. The wrist pad of the present invention is cut into a specific shape after it is formed. So, it does not need molds with a different shape, the wrist pads of the present invention can be made into different shapes.

What is claimed is:

1. A method of manufacturing a wrist pad, comprising the steps of:
    a. kneading and stirring a mixture having natural rubber and a foaming agent repeatedly to make it well mixed;
    b. pressing said well mixed mixture into a plank element;
    c. forming an arched portion on said plank element;
    d. foaming said plank element with said arched portion so that a chemical reaction will occur between said natural rubber and said foaming agent to produce an air pressure for forming said plank element into a wrist pad, and e. cooling said foamed wrist pad and cutting said wrist pad into a predetermined shape.

2. The method as defined in claim 1, wherein, in step c, said arched portion of said plank clement is hollow therein.

3. The method as defined in claim 2, which further comprises a step of attaching a fixture device onto said plank element and pressing said plank element to form said arched portion in step c.

4. The method as defined in claim 3, wherein pressing of said plank element is by hand work.

5. The method as defined in claim 1, which further comprises a step of attaching a cloth piece onto said plank element before said plank element being pressed in step c.

6. The method as defined in claim 1, which further comprises a step of removing said fixture device from said foamed wrist pad before step e.

7. The method as defined in claim 1, wherein said mixture is sent to a kneading machine to knead it first and then sending said mixture to a stirring machine to make it well mixed in step a.

* * * * *